(No Model.)
S. G. ALEXANDER.
MOLD FOR MAKING ARTICLES OF FELT.
No. 259,453. Patented June 13, 1882.
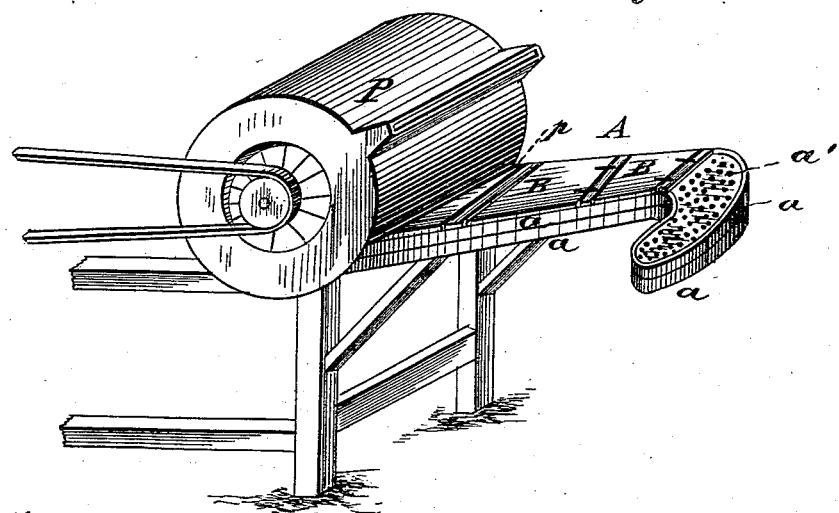
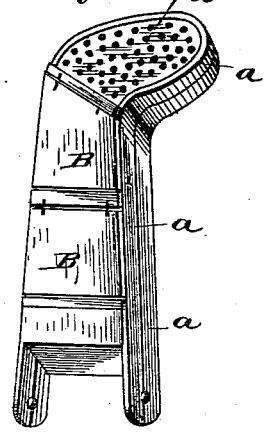
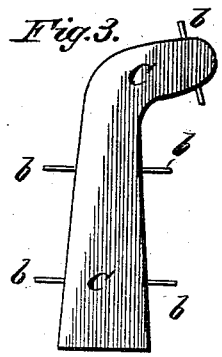
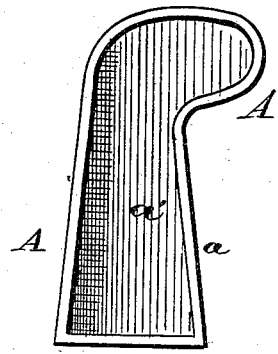
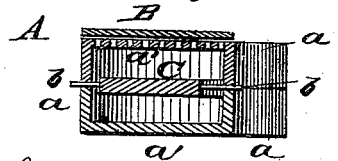
WITNESSES:
Fred. G. Dieterich
P. C. Dieterich
INVENTOR,
Samuel G. Alexander,
by Louis Bagger & Co.
ATTORNEYS.

UNITED STATES PATENT OFFICE.

SAMUEL G. ALEXANDER, OF CARO, MICHIGAN.

MOLD FOR MAKING ARTICLES OF FELT.

SPECIFICATION forming part of Letters Patent No. 259,453, dated June 13, 1882.

Application filed April 7, 1882. (No model.)

*To all whom it may concern:*

Be it known that I, SAMUEL GEORGE ALEXANDER, of Caro, in the county of Tuscola and State of Michigan, have invented certain new and useful Improvements in Molds for Making Articles of Felt; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view, showing in part a machine for picking fibrous material—as wool, cotton, hair, &c.—and the application of my improvement in one form thereto. Fig. 2 is a view of a mold for making wearing material for the foot. Fig. 3 is a view of the removed core of the mold, and Figs. 4 and 5 are detailed views of the mold.

Corresponding parts in the several figures are denoted by like letters of reference.

This invention has relation to the manufacture of felt goods especially designed for head, hand, foot, and leg wear—as hats, caps, socks, stockings, leggins, mittens, &c.—from fibrous material, as cotton, hair, wool, &c.; and it consists in the detailed construction and combination of parts of the mold applied to a picking-machine, substantially as hereinafter more fully set forth and claimed.

In carrying out my invention I employ, as will be observed by reference to the accompanying drawings, a mold, A, which in the present instance is adapted for the manufacture of foot and leg wear, but which may be adapted for the manufacture of hats, caps, mittens, &c., as may be desired. This mold consists of two parts or halves, $a$ $a$, capable of being detachably connected together by hinges, clamps, hooks, or other fastenings to permit them to be readily and easily opened or separated. The bottom and top sides of the mold are made preferably of plates of zinc, copper, tin, or any other smooth-surfaced material, $a'$, the top side as well as the bottom, if desired, being finely punctured or perforated, as seen in several of the figures, the purpose of which is to permit the escape of the blast received into the mold from the picking-machine, as will be readily understood hereinafter, during the process of filling the mold. The top perforated side of the mold is covered with a number of imperforate plates or sections, B, connected to the mold in any suitable manner to permit them to be separately removed or taken off one at a time. Within the mold is arranged, and held intact therewith, to provide sufficient space between them to answer to the intended thickness of the prospective article, a core, C. The core can be secured in place, so as to be readily removed, by wires $b$.

The operation is as follows: The open end of the mold being attached to the picking-machine P in line with an opening, $p$, therein, the blast generated by the action of the revolving picker-wheel will compactly thrust the fibrous material—cotton, hair, wool, &c., as the case may be—into the mold, one (the extreme outer one) of the plates B having been previously removed for the exit of the air, and thus effect the process of manufacturing the article. As the process proceeds and the outer uncovered perforations are closed by the filling in of the material, the next section of cover will be removed, and so on until the process or article is completed. The article may be further treated to strengthen it.

Having thus described my invention, I claim and desire to secure by Letters Patent of the United States—

In a felt-molding apparatus, the combination of the foraminated flanged plates $a$ $a'$, provided with the hinged doors B and core-piece C, provided with the wires $b$, adapting said core-piece to be held in place between the flanged plates $a$ $a'$ by clamping the ends of the wires between the meeting flanges of the plates, as shown and set forth.

In testimony that I claim the foregoing as my own I have hereunto affixed my signature in presence of two witnesses.

SAMUEL GEORGE ALEXANDER.

Witnesses:
MANLY O. DODGE,
JOHN F. SEELEY.